3,065,192
LIGHT-STABILIZED POLYVINYLCHLORIDE FORMULATION

William A. Dimler, Jr., Colonia, and James A. Gallagher, Cranford, N.J., assignors to Esso Research and Engineering Company, a corporation of Delaware
No Drawing. Filed Feb. 18, 1959, Ser. No. 793,957
7 Claims. (Cl. 260—23)

This invention relates to blends of plasticized polyvinylchloride and polycyclopentenyl carboxylates and more particularly relates to producing plasticized polyvinylchloride which is stabilized against decoloration by light by incorporating therein minor proportions of dicyclopentenyl mono-carboxylates.

It is known that polyvinylchloride may be plasticized with minor proportions of various alkyl or aryl carboxylates to produce flexible, tough films which are useful as plastic coatings for a variety of materials.

One of the best and most widely used plasticized polyvinylchloride formulations comprises an admixture of polyvinylchloride with a $C_1$ to $C_{12}$ alkyl or aryl carboxylate plasticizer and preferably also a metal-containing heat stabilizer such as dibasic lead phthalate, sodium naphthenate or especially a group II metal-containing heat stabilizer such as barium-cadmium phenate, barium-cadmium stearate, barium stearate, cadmium octoate, or calcium stearate with or without a phosphite chelating agent such as a $C_3$ to $C_{48}$ alkyl phosphite (e.g., triisooctyl phosphite, tridecyl phosphite, tri-2-ethylhexyl phosphite, trihexadecyl phosphite, or such commercial phosphite chelating agents as Mark-C or Ferro-904). Films formed from such a formulation have excellent resistance to heat aging but do not have satisfactory resistance to decoloration when exposed to light.

In accordance with the present invention, it has now been discovered that polyvinylchloride, plasticized with a $C_1$ to $C_{12}$ alkyl or $C_6$ to $C_{12}$ aryl carboxylate and preferably containing a group II metal-containing heat stabilizer and optionally containing a phosphite chelating agent, may be effectively stabilized against decoloration by light by incorporating therein about 0.1 to 20, advantageously about 0.5 to 15 and preferably about 2 to 10 wt. percent of a polycyclopentenyl carboxylate, preferably a dicyclopentenyl $C_1$ to $C_{40}$ aliphatic mono-carboxylate.

In general, polyvinylchloride is produced by polymerizing the vinylchloride monomer, with agitation, suspended in water (i.e., in an aqueous medium) by means of a suspension agent such as polyvinyl alcohol and an oil-soluble catalyst such as hydrogen peroxide, benzoyl peroxide, ditertiary butyl peroxide, dicumyl peroxide, cumene hydroperoxide or the like at temperatures of between about −50° C. to +250° C. and preferably between −20° C. and +150° C. Alternatively, polyvinylchloride may be produced from the vinylchloride monomer by emulsion polymerization in the presence of suitable emulsifying agents such as sodium laurate, ammonium naphthalene sulfonate and sodium lauryl sulfate and water-soluble catalysts such as sodium peroxysulfate. In either case a polyvinylchloride homopolymer is produced having a specific viscosity of between about 0.70 and 1.40 (ASTM–1243–52T). Alternatively, copolymers of about 1 to 20, preferably 2 to 10% of vinyl acetate, with the balance being vinyl chloride, may also be used (e.g., 5% vinyl acetate and 95% vinylchloride).

In practicing the present invention, about 100 parts by weight of such polyvinylchloride polymers as above are blended with about 5 to 100 parts by weight, advantageously about 10 to 100 parts by weight, preferably about 25 to 75 parts by weight of a $C_1$ to $C_{12}$ alkyl or $C_6$ to $C_{12}$ aryl carboxylate plasticizer, about 0.05 to 10.0, advantageously about 0.1 to 8.0 and preferably about 0.5 to 4.0 parts by weight of a heat stabilizer comprising a group II metal phenate or group II metal $C_2$ to $C_{30}$ carboxylate, about 0 to 5.0, advantageously about 0.01 to 4.0 and preferably about 0.1 to 2.0 parts by weight of a $C_3$ to $C_{48}$ alkyl phosphite chelating agent and about 0.05 to 20, advantageously about 0.3 to 15, preferably about 1 to 10 parts by weight of a polycyclopentenyl carboxylate, advantageously a dicyclopentenyl $C_1$ to $C_{40}$ aliphatic mono-carboxylate, and preferably a dicyclopentenyl $C_6$ to $C_{20}$ aliphatic mono-carboxylate. The resulting composite, when processed at about 250° to 400° F., advantageously at about 280° to 360° F. and preferably at about 300° to 340° F. for about 1 to 30, advantageously about 3 to 20 and preferably about 5 to 15 minutes results in a material which is extremely resistant to both heat and decoloration due to light.

Suitable plasticizers within the purview of the present invention for use in the polyvinylchloride, polycyclopentenyl carboxylate-containing compositions of the present invention include, among others, such $C_1$ to $C_{12}$ alkyl or $C_6$ to $C_{12}$ aryl carboxylates as methyl abietate, triethyl aconitate, dimethyl phthalate, diethyl phthalate, dibutyl phthalate, dihexyl phthalate, di-isooctyl phthalate, di-2-ethylhexyl phthalate, didecyl phthalate, diphenyl phthalate, butyl ricinoleate, mixtures thereof, etc.

The polycyclopentadienes from which the present polycyclopentenyl carboxylates are derived include di-, tri-, tetra-cyclopentadienes and even higher polymers. Dicyclopentadiene and the $C_1-C_4$ alkyl substituted dicyclopentadienes are preferred. Especially preferred are dicyclopentadiene, methyl dicyclopentadiene, and dimethyl dicyclopentadiene.

The above polycyclopentadienes are reacted with aliphatic monocarboxylic acids to form the unsaturated polycyclopentadiene esters, i.e., the polycyclopentenyl carboxylates. The acids preferred include saturated and unsaturated monocarboxylic acids having about 1 to 40 carbon atoms. The $C_6-C_{20}$ acids are preferred. Examples of suitable saturated acids are formic, butyric, valeric, caproic, caprylic, capric, lauric, palmitic, stearic, cerotinic, etc. Examples of suitable unsaturated acids are crotonic, undecylenic, oleic, erucic, linoleic, linolenic, blends of unsaturated fatty acids from natural sources, e.g., castor oil, soybean oil, coconut oil, tall oil, etc.

The polycyclopentadienes may be reacted directly with the above acids to form the corresponding esters or the polycyclopentadienes may first be hydrolyzed to alcohols and then reacted with the acids to form the esters.

The unsaturated esters of this type may be represented by the following formula:

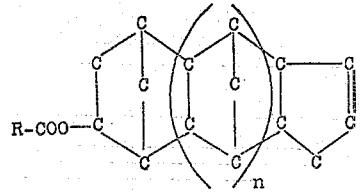

wherein $n$ is an integer between 0 and 2, R is a monovalent hydrocarbon radical, and the carbon valences not satisfied in the formula are satisfied by hydrogen or $C_1-C_4$ alkyl groups. The preferred esters are the dicyclopentadiene esters, i.e., where $n$ is 0, in which case the esters are better known as dicyclopentenyl carboxylates.

For the direct esterification, the reaction temperature may vary over a wide range such as 25° to 150° C., depending on the specific reactants and catalyst employed. Above about 150° C., the dicyclopentadienes crack to the monomers. Preferably the reaction temperature is from 50° to 125° C. Unless the monobasic acid reactant is strong enough to catalyze its own reaction, an acid catalyst is necessary for the direct esterification. Suitable catalysts for this reaction include $AlCl_3$, $BF_3$, $H_2SO_4$, and other Lewis acids, e.g., acids capable of accepting a pair of electrons. $BF_3$ is preferred. The reactants are added in a ratio such that at least an equimolecular amount of the polycyclopentadiene is present. Preferably, the molar ratio of polycyclopentadiene to acid is between 1:1 and 2:1. Only the double bond of the endomethylene ring of the polycyclopentadiene is reacted, the remaining double bond remaining inactive. Diluents such as benzene, toluene, cyclohexene, cyclohexanone, etc., may be used for this esterification. The esters may be recovered by usual means such as distillation, etc.

When the polycyclopentadienes are hydrolyzed prior to esterification, the polycyclopentadiene is reacted with at least about an equimolecular amount of water in the presence of a mineral acid catalyst. Preferably about 2 to 20 moles of water, as part of a dilute sulfuric acid solution, e.g., 20–50% $H_2SO_4$, are reacted per mole of polycyclopentadiene. Again only the double bond of the endomethylene ring of the polycyclopentadienes is hydrolyzed, the remaining double bond remaining inactive. The hydrolysis temperature may vary from about 60° to 120° C., depending on the concentration of $H_2SO_4$. Preferably a reflux temperature of about 100°–110° C. is maintained. The resulting polycyclopentenyl alcohol may be recovered by conventional means, e.g., distillation, extraction, etc.

The cyclic alcohol is then esterified with the aliphatic mono-carboxylic acid in the conventional manner. At least an equimolecular amount of the alcohol is heated with the acid to a temperature varying from about 80° to 220° C. Preferably a molar ratio of alcohol to acid of 1:1 to 2:1, and an esterification temperature from 120° to 150° C. are employed.

Catalysts are not necessary for this esterification reaction, but may be used, if desired, to speed up the reaction. Suitable catalysts are sulfuric acid, p-toluene sulfonic acid, benzene sulfonic acid, phosphoric acid, etc. Entrainers or azeotrope agents such as benzene, toluene, hexane, heptane, etc. may also be used, or the excess alcohol in the reaction mixture may be used for entraining the water. The esters may be recovered by usual means, such as distillation, solvent extraction, etc. resulting in substantially pure polycyclopentenyl carboxylates.

In order to more fully illustrate but not to limit the present invention, the following experimental data are given:

Example

Polyvinylchloride (Goodrich, Geon 101EP), and an alkyl carboxylate plasticizer (didecyl phthalate), barium-cadmium phenate heat stabilizer, triisooctyl phosphite as chelating agent and stearic acid as a lubricant were compounded in the absence and presence of dicyclopentenyl oleate as the light stabilizer, according to the following formulation the results being as follows:

| Component | Parts by weight | |
| --- | --- | --- |
| Polyvinylchloride | 100 | 100 |
| Didecyl phthalate | 50 | 45 |
| Dicyclopentenyl Oleate | -- | 5 |
| Ba-Cd Phenate | 2 | 2 |
| Triisooctyl phosphite | 0.5 | 0.5 |
| Lubricant (Stearic Acid) | 0.5 | 0.5 |
| Milled at 325° F. for 7 min. and pressed under 2,100 p.s.i. at 325° F. for 7 min.: | | |
| Tensile strength (p.s.i.) | 2,690 | 2,660 |
| Elongation (percent) | 300 | 310 |
| 100% modulus (p.s.i.) | 1,710 | 1,740 |
| Aged 7 days at 212° F.: | | |
| Tensile strength (p.s.i.) | 2,600 | 2,520 |
| Elongation (percent) | 265 | 280 |
| 100% modulus (p.s.i.) | 1,890 | 1,880 |
| Color before exposure to Ultraviolet Light | White | White |
| U.V. Light Stability: | | |
| 300 hours | Spotted | White |
| 500 hours | Black | White |
| 700 hours | Black | Yellow |

The above data show that the addition of the polycyclopentenyl carboxylate "dicyclopentenyl oleate" extends the light stability of plasticized polyvinylchloride from less than 300 hours to more than 700 hours.

Resort may be had to modifications and variations of the disclosed embodiments without departing from the spirit of the invention or the scope of the appended claims.

What is claimed is:

1. A vinylidene chloride-free composition which comprises a major proportion of polyvinylchloride polymer selected from the group consisting of polyvinylchloride and copolymers of 80 to 99% vinyl chloride and 1 to 20% vinyl acetate and a minor proportion of a dicyclopentenyl $C_6$ to $C_{20}$ aliphatic mono-carboxylate.

2. A vinylidene chloride-free composition comprising a major proportion of polyvinylchloride polymer selected from the group consisting of polyvinylchloride and copolymers of 80 to 99% vinyl chloride and 1 to 20% vinyl acetate and a minor proportion of an admixture of a $C_1$ to $C_{12}$ carboxylate plasticizer, a group II metal-containing heat stabilizer, and a dicyclopentenyl $C_6$ to $C_{20}$ aliphatic mono-carboxylate.

3. A composition according to claim 2 in which the plasticizer is present in an amount of between about 25 and 75 weight percent based on polyvinylchloride of an organic ester selected from the group consisting of $C_1$ to $C_{12}$ alkyl carboxylates, $C_6$ to $C_{12}$ aryl carboxylates and mixtures thereof.

4. A composition according to claim 2 in which the heat stabilizer is a group II organic metal-containing salt being present in an amount of between about 0.05 and 8.0 weight percent based on polyvinylchloride.

5. A composition according to claim 2 in which there is also present a chelating agent, said chelating agent being an alkyl phosphite present in an amount of between about 0.01 and 4.0 weight percent based on polyvinylchloride.

6. A composition according to claim 2 in which the dicyclopentenyl aliphatic mono-carboxylate is a $C_6$ to $C_{20}$ aliphatic mono-carboxylate being present in an amount of between about 0.05 and 20.0 weight percent based on polyvinylchloride.

7. A process for producing a plasticized polyvinylchloride polymer selected from the group consisting of polyvinylchloride and copolymers of 80 to 99% vinyl chloride and 1 to 20% vinyl acetate which is stable to decoloration by light, which comprises blending with a major proportion of said polyvinylchloride polymer a minor proportion of a $C_1$ to $C_{12}$ carboxylate plasticizer and about 0.05 to 20.0 weight percent based on polyvinylchloride of a polycyclopentenyl carboxylate and mixing the resulting blend at a temperature level of about 250° to 400° F. for between about 1 and 30 minutes.

References Cited in the file of this patent

UNITED STATES PATENTS

| | | |
| --- | --- | --- |
| 2,313,757 | Matheson et al. | Mar. 16, 1943 |
| 2,336,208 | Alder et al. | Dec. 7, 1943 |
| 2,449,959 | Staudinger et al. | Sept. 21, 1948 |
| 2,564,646 | Leistner et al. | Aug. 14, 1951 |
| 2,716,092 | Leistner et al. | Aug. 23, 1955 |
| 2,814,639 | Bartlett et al. | Nov. 26, 1957 |
| 2,824,079 | Fischer | Feb. 18, 1958 |
| 2,875,244 | Bartlett et al. | Feb. 24, 1959 |